(12) United States Patent
Cook

(10) Patent No.: US 12,124,934 B2
(45) Date of Patent: *Oct. 22, 2024

(54) MACHINE LEARNING-BASED DISASTER MODELING AND HIGH-IMPACT WEATHER EVENT FORECASTING

(71) Applicant: Ashton Robinson Cook, Norman, OK (US)

(72) Inventor: Ashton Robinson Cook, Norman, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,858

(22) Filed: Apr. 25, 2022

(65) Prior Publication Data

US 2022/0327433 A1 Oct. 13, 2022

Related U.S. Application Data

(63) Continuation of application No. 16/455,121, filed on Jun. 27, 2019, now Pat. No. 11,315,046.

(60) Provisional application No. 62/797,261, filed on Jan. 26, 2019, provisional application No. 62/744,028, filed on Oct. 10, 2018, provisional application No. 62/703,380, filed on Jul. 25, 2018, provisional application No. 62/703,387, filed on Jul. 25, 2018, provisional application No. 62/702,547, filed on Jul. 24, 2018, provisional application No. 62/691,462, filed on Jun. 28, 2018.

(51) Int. Cl.
*G06N 20/20* (2019.01)
*G01W 1/10* (2006.01)
*G06N 5/04* (2023.01)

(52) U.S. Cl.
CPC .............. *G06N 20/20* (2019.01); *G01W 1/10* (2013.01); *G06N 5/04* (2013.01)

(58) Field of Classification Search
CPC ............ G06N 20/20; G06N 5/04; G01W 1/10
See application file for complete search history.

(56) References Cited

U.S. PATENT DOCUMENTS

| | | | |
|---|---|---|---|
| 9,336,492 B1 | 5/2016 | Mewes et al. | |
| 10,386,541 B2 * | 8/2019 | Hamann | G01W 1/10 |
| 11,119,250 B2 | 9/2021 | O'Donncha et al. | |
| 11,315,046 B1 * | 4/2022 | Cook | G06N 20/20 |
| 2010/0175886 A1 * | 7/2010 | Bohacs | G01V 20/00 |
| | | | 702/11 |
| 2013/0024118 A1 * | 1/2013 | Gershunov | G01W 1/10 |
| | | | 702/3 |
| 2014/0324352 A1 * | 10/2014 | Hamann | G01W 1/10 |
| | | | 702/3 |

(Continued)

FOREIGN PATENT DOCUMENTS

| | | | | |
|---|---|---|---|---|
| CN | 106599995 A | * | 4/2017 | ............. G06Q 10/04 |
| CN | 109902885 A | * | 6/2019 | ............. G06Q 10/04 |

(Continued)

*Primary Examiner* — Tung S Lau
(74) *Attorney, Agent, or Firm* — U. Maryland Balt. Carey School of Law MIPLRC/IPEC

(57) ABSTRACT

Machine learning-based disaster modeling and high-impact weather event forecasting are provided herein. Embodiments herein provide a flexible machine-learning platform for providing skillful forecast of severe weather (tornadoes, damaging wind gusts, and hail), tropical cyclone activity, and precipitation, with skill potentially extending to 13 months or more.

18 Claims, 7 Drawing Sheets

(56) References Cited

U.S. PATENT DOCUMENTS

2017/0131435 A1* 5/2017 Peacock ................. G01W 1/10
2021/0294399 A1 9/2021 Belvant More et al.

FOREIGN PATENT DOCUMENTS

CN 109902885 B 6/2019
CN 112818608 A * 5/2021 ............. G06F 30/27

* cited by examiner

MACHINE LEARNING-BASED DISASTER MODELING AND HIGH-IMPACT WEATHER EVENT FORECASTING

CROSS-REFERENCE TO RELATED APPLICATION(S)

This application claims the benefit and priority of U.S. provisional application Ser. No. 62/691,462, filed on Jun. 28, 2018; U.S. provisional application Ser. No. 62/702,547, filed on Jul. 24, 2018; U.S. provisional application Ser. No. 62/703,380, filed on Jul. 25, 2018; U.S. provisional application Ser. No. 62/703,387, filed on Jul. 25, 2018; U.S. provisional application Ser. No. 62/744,028, filed on Oct. 10, 2018; and U.S. provisional application Ser. No. 62/797,261, filed on Jan. 26, 2019, each of which are each hereby incorporated by reference herein in their entireties, including all references and appendices cited therein, for all purposes.

TECHNICAL FIELD

The present disclosure relates to machine learning, and in some embodiments, to machine learning-based methods of disaster modeling, high-impact weather event analysis, including extended range forecasting of the same.

BACKGROUND

Skillful and accurate extended-range forecasts of severe weather are currently unavailable and may potentially provide value to a wide range of professions (e.g., insurance, reinsurance, and underwriting) and government agencies (e.g., U.S. Military, Federal Emergency Management Agency). Professionals in these fields generally use long-term averages of severe weather frequency to assess risk and plan for disasters. For the insurance industry, this approach potentially exposes these industries to losses in excess of billions of dollars in the event of extreme weather conditions that deviate from those longer-term averages (i.e. hail storms, tornado outbreaks, tropical cyclone landfalls, extreme rainfall, ice storms, etc.). Many severe weather forecasts are skillful through three to seven days, although this doesn't provide enough time for professionals to properly alter their risk management strategy in advance of unusually severe or extreme weather conditions. These limited time frames also complicate federal disaster preparation efforts, and endanger the lives of countless individuals.

Extended-range predictions of severe weather (to monthly and even yearly timescales) do not exist at this time. Sparrow and Mercer (2015) used El Niño Southern Oscillation and geopotential height variability, stepwise multivariate linear regression, and support vector regression to diagnose predictability of U.S. winter tornado seasons. Nath et al. (2015) also developed and described a model using neural networks to predict seasonal tropical cyclone activity over the North Indian Ocean.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 4A-4C collectively illustrate example two-dimensional domains.

FIG. 13A illustrates a map of a year-long for a specific type of weather event, the map being generated using the machine learning processes disclosed herein.

DETAILED DESCRIPTION

Overview

Figure 2:
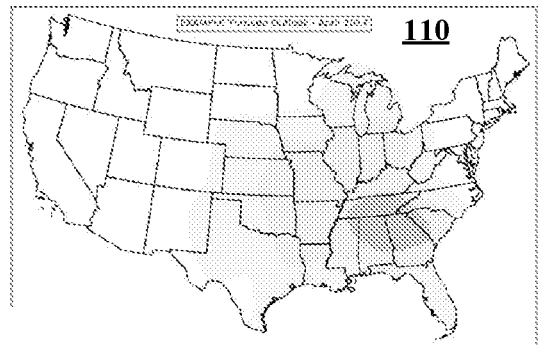
FIG. 2 is a map comprising an example forecast for a spatial domain, generated using the machine learning processes disclosed herein.

The systems and methods disclosed herein implement machine/deep learning tools to provide skillful severe weather forecasts in the United States east of the Rockies. These severe weather outlooks forecast the following severe weather perils at time ranges extending out to 12-13 months: (1) tornadoes (F0-F1) and significant tornadoes (F2-F5); (2) hail (one to two inches in diameter) and significant hail (two+ inches in diameter); and thunderstorm wind gusts exceeding severe thresholds (50 knots or greater)—just to name a few. Additional embodiments enable forecasts of any extreme weather for which (1) there is a reliable historical record of occurrence or (2) their occurrence can be implied through the use of weather observations or dynamical models. These include tropical cyclones, precipitation (such as rainfall, ice accumulation, and snowfall), dust storms, and heatwaves—just to name a few. While specific examples of weather events of importance have been described in examples herein, the present disclosure is not specifically limited to these example weather events. Moreover, when example attributes of weather events such as tornado strength are referenced, these are merely examples of weather event attributes that can be selected for analysis according to the present disclosure. For example, if a use case references forecasts for tornadoes having up to F1 strength, other example could include forecasts for tornadoes of any of F0 to F5 strength, inclusive.

Embodiments of the present disclosure extend the predictability of weather forecasts with demonstrated skill through 13 months and even further in some instances. Machine and deep learning models generally require past data in order to identify patterns and relationships in that data before predicting outcomes. The present disclosure identifies relationships between historical atmospheric and oceanic observations and extreme weather events and subsequently uses those relationships to forecast occurrence, frequency, and concentrations of various extreme weather events through the use of machine or deep learning. These relationships are utilized to create meaningful and practical disaster models and provide long-term prediction of significant weather events into the future.

In one embodiment, the systems and methods herein are configured to generate an L-model, which identifies relationships between historical atmospheric and oceanic data and historical severe weather reports to generate forecasts of tornadoes, hail, and severe thunderstorm wind gusts. In another embodiment, relationships between tropical cyclone frequency and historical atmospheric and oceanic conditions are identified and used to create tropical cyclone forecasts. In yet another embodiment, relationships between precipitation and historical atmospheric and oceanic conditions are used to create precipitation forecasts. The forecasts developed using the systems and methods disclosed herein can span various timeframes ranging from one week to one year or more. In various embodiments, forecasts can be created for meta-time periods, such as seasons or even years.

The present disclosure can be configured to predict various hazards which include, but are not limited to, sea ice development, sea ice melt, dust storms, fire weather, surface wind, and open-water wave activity. These and other advantages of the present disclosure are provided in greater detail herein.

Illustrative Embodiments

Figure 1:
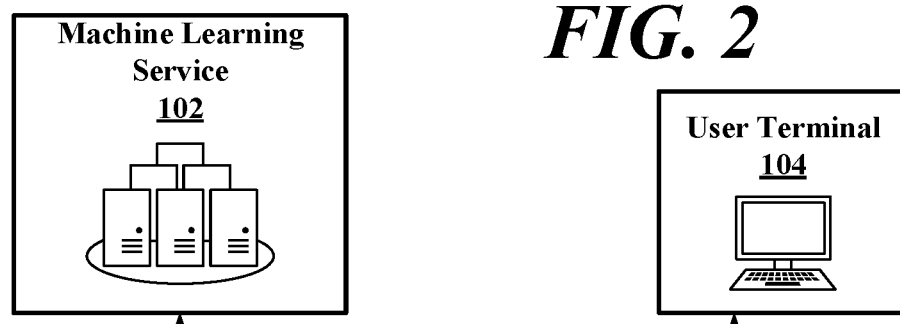
FIG. 1 depicts an illustrative architecture in which techniques and structures for providing the systems and methods disclosed herein may be implemented.
Figure 1:
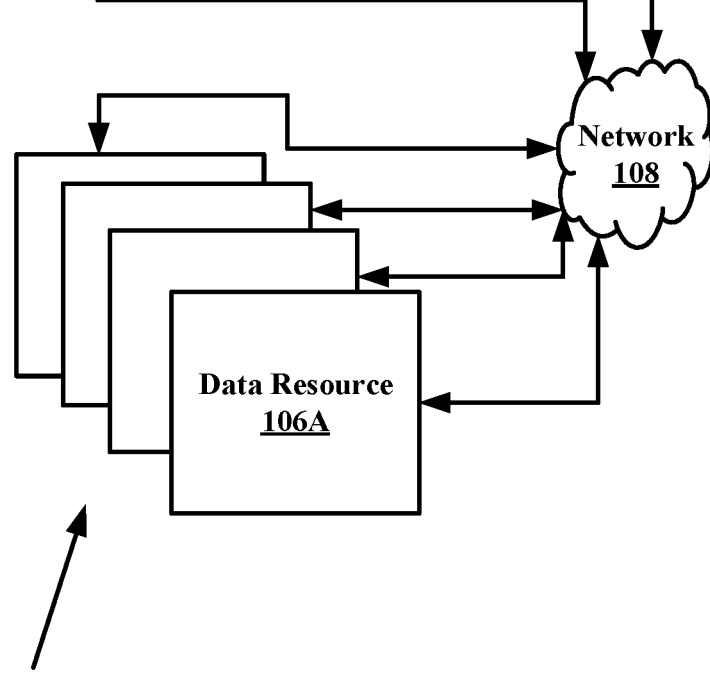

Turning now to the drawings, FIG. 1A depicts an illustrative architecture 100 in which techniques and structures of the present disclosure may be implemented. The illustrative architecture 100 may include a machine learning service 102, a user terminal 104, and a plurality of data resources 106A-106N, which are coupled through a network 108. The network 108 may include any one or a combination of multiple different types of networks, such as cable networks, the Internet, wireless networks, and other private and/or public networks. In some instances, the network 108 may include cellular, Wi-Fi, or Wi-Fi direct.

In various embodiments, a user of the user terminal 104 can create and execute machine learning models (such as the L-model) through use of the machine learning service 102. In general, the machine learning service 102 leverages big weather data available through the plurality of data resources 106A-106N, based on the weather related data required to power the machine learning models created by the machine learning service 102. In one or more embodiments, the machine learning service 102 is implemented in a cloud-based resource, while other embodiments allow for the machine learning service 102 to be executed at a server level. FIG. 1B illustrates an example predictive model 110 created by the machine learning service 102. The predictive model 110 is provided on a graphical user interface in the form of a map that comprises F1 tornado outlook data, generated using the systems and methods disclosed herein, to create an outlook or forecast valid for April of 2017. The forecasts are concentrations of tornadoes within roughly 75 miles of a point of reference along and East of the Rocky Mountains.

Generally, the systems and methods herein are used for creating forecasts of high-impact weather phenomenon, including temperature, tornadoes, hail, thunderstorm wind gusts, tropical cyclones, and precipitation (hereafter referred to as predictands), as well as predicting and modeling disasters. Some embodiments are also provided to aid in detailed description of the processes disclosed herein, although the plurality of embodiments are not limited to the embodiments disclosed.

Figure 3:
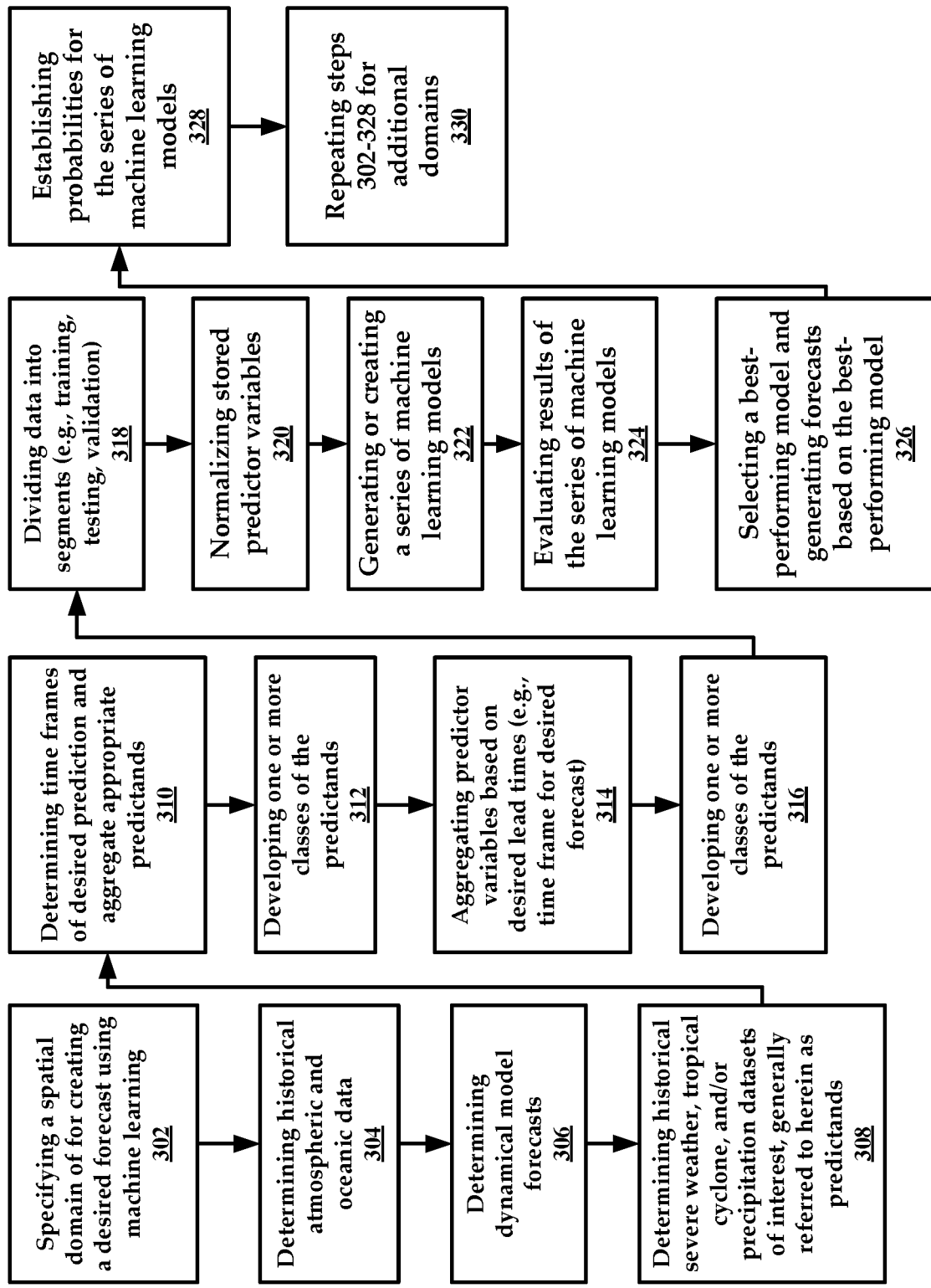
FIG. 3 is a flowchart of an example method of the present disclosure.
Figure 4C:
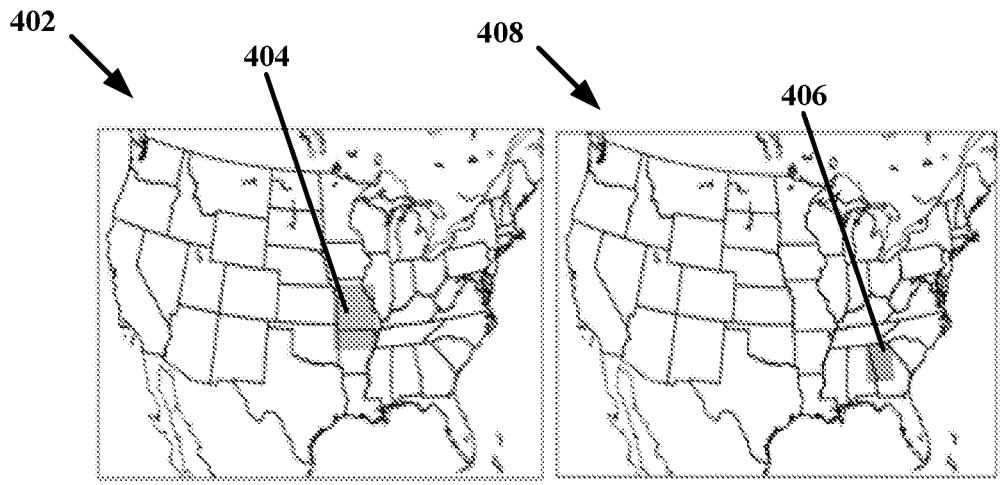
Figure 4C:
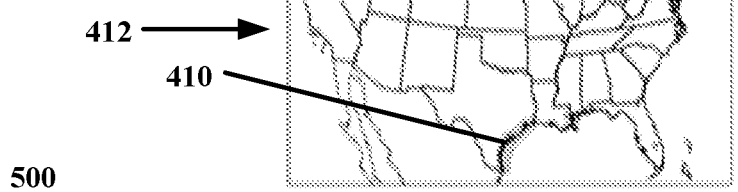

FIG. 3 is a flowchart of an example modeling method for creating a predictive forecast and/or a disaster model in accordance with the present disclosure. Initially, the method includes a step 302 of specifying a spatial domain of for creating a desired forecast using machine learning. In various embodiments, a two-dimensional domain is selected for forecast output. This selection is may depend on a desired forecast and can vary in size. These sizes can range from a 0.25° latitude by 0.25° longitude bounding box to an entire country (i.e., the United States) or ocean basin (i.e., the Atlantic basin). FIG. 4A illustrates an example map 402 that includes an example two-dimensional domain 404. Another example two-dimensional domain 406 is illustrated on map 408. Yet another example two-dimensional domain 410 is illustrated on map 412. Thus, a two-dimensional domain can include any bounded area. While some embodiments contemplate developing forecasts over an entire ocean basin. Certain embodiments; forecasts can also expand to entire continents or even in localized areas as fine-scale as 1 km by 1 km (precipitation), In some embodiments, two-dimensional domain sizes ranging from three degrees latitude by three degrees longitude bounding box to a five degrees latitude by five degrees longitude bounding box can be used for severe weather. For tropical cyclone forecasts, varying sizes of spatial domains can be employed depending on the desired forecast output. For instance, in tropical cyclone landfall forecasts, the spatial domain may encompass regions near a specific coastline (see map 412) or specified over oceanic regions or for entire ocean basins. For precipitation forecasts, a two-dimensional domain may encompass much smaller regions (i.e., 0.25° latitude by 0.25° longitude bounding box).

Referring back to FIG. 3, the method includes a step 304 of determining historical atmospheric and oceanic data. This process can be performed by the machine learning service 102 by obtaining data from the plurality of data resources 106A-106N (see FIG. 1A).

Examples of weather data that can be obtained from the plurality of data resources 106A-106N are provided herein. For example, historical atmospheric and oceanic observations and reanalyses can be used to train machine learning models to generate forecasts. Atmospheric reanalyses developed during the NCEP/NCAR Reanalysis project (as described in Kalnay et al., 1996) can be utilized. This global dataset is defined on a 2.5° longitude by 2.5° latitude grid with 28 vertical levels. These reanalyses are available dating back to 1948. Specific variables retrieved and/or derived from these analyses for model development include: geopotential heights, geopotential height variance, v-component wind, v-component wind variance, u-component wind, u-component wind variance, specific humidity, specific humidity variance, precipitable water, precipitable water variance, temperature, and temperature variance.

Sea surface temperature reanalyses can be retrieved from the National Oceanic and Atmospheric Administration's Extended Reconstructed Sea Surface Temperature analysis (ERSST v.4; Huang et al. 2014) in a similar manner as atmospheric data described earlier in this step. The monthly analyses are available on a 2° longitude by 2° latitude grid over ocean areas dating back to 1854. In another embodiment, both atmospheric and sea surface temperature information can also be used simultaneously for developing models and generating forecasts. In other embodiments, larger-scale oscillations influencing global weather could also incorporated for training models. These larger-scale oscillations include the El Niño Southern Oscillation (ENSO), the Pacific Decadal Oscillation (PDO), North Atlantic Oscillation (NAO), Arctic Oscillation (AO), Pacific-North American teleconnection pattern (PNA), Madden-Julian Oscillation (MJO), Global Atmospheric Angular Momentum (GLAAM), Global Wind Oscillation (GWO), East Atlantic Pattern (EA), West Pacific Pattern (WP), East Pacific/North Pacific Pattern (EP/NP), East Atlantic/West Russia Pattern (EA/WR), Scandinavia pattern (SCA), Tropical/Northern Hemisphere Pattern (TNH), Polar/Eurasia Pattern (POL), and Pacific Transition Pattern (PT). Standardized indices characteristic of these larger-scale atmospheric and oceanic oscillations are archived online by the NOAA Climate Prediction Center (http://www.cpc.noaa.gov) and NOAA Earth Systems Research Laboratory (https://www.esrl.noaa.gov/psd/). Monthly Global Atmospheric Angular Momentum (GLAAM) and Global Wind Oscillation (GWO) indices can be made available via Climate Prediction Center and Earth Systems Research Laboratory archives and also calculated using reanalyses from the NCEP/NCAR Reanalysis project. A few of these large-scale oscillations have known influences on severe weather in the United States, including ENSO (Cook and Schaefer 2008, Allen et al. 2015, Cook et al. 2017), GWO (Gensini and Mariano 2015), PNA, PDO, and NAO (Munoz and Enfield 2006), and MJO (Barrett and Gensini 2013). Four separate ENSO indices can be incorporated for use in this study: Nino 1+2, Nino 3, Nino 3.4, and Nino 4 (located at: ftp://ftp.cpc.ncep.noaa.gov/wd52dg/data/indices/tele_index.nh). In other embodiments of the invention, ENSO can be described using the Oceanic Nino Index, Multivariate Index, the Southern Oscillation index, or any combination of these indices.

In other embodiments, predictor variables can be explicitly calculated by performing statistical dimensionality reduction (via principal component analysis, canonical correlation analysis, or singular value decomposition) to determine atmospheric and oceanic modes of variability that influence predictor variables. These types of predictor variables are very similar to the large-scale oscillations described above, but can be customized to specific geographic domains known to influence desired predictands.

Atmospheric and oceanic data as disclosed above can be used to train models and create forecasts are collectively referred to as "reanalysis data". In more detail, the method includes a step 306 of determining dynamical model forecasts. In some embodiments, dynamical model forecasts may be utilized for training models and creating forecasts in a similar manner to reanalysis data as described above. Examples of model forecasts (hereafter referred to as "dynamical data") include (but are not limited to) output from the following forecast systems: NOAA Climate Forecast System Operational Forecasts (Saha and Coauthors 2010, 2014); Global Forecast System (http://www.emc.ncep.noaa.gov/index.php?branch=GFS); North American Mesoscale Forecast System (https://www.ncdc.noaa.gov/data-access/model-data/model-datasets/north-american-mesoscale-forecast-system-nam); North American Multi-Model Ensemble (Kirtman et al., 2014); and General Circulation Models, including The Community Climate System Model (CCSM4), Community Earth System Model (CESM1), The Canadian Coupled Climate Model (CanCM4)—all available at the National Center for Environmental Information (website: https://www.ncdc.noaa.gov/data-access/model-data/model-datasets/north-american-multi-model-ensemble). Forecast output from these systems may exist in the form of daily analyses, monthly (time-averaged) analyses, daily forecasts, or monthly (time-averaged) forecasts. These forecasts may also comprise similar atmospheric and oceanic variables as those contained in reanalysis datasets (described above).

In cases where a combination of both reanalysis data and dynamical data are used by the machine learning service 102 for generating forecasts in accordance with the present disclosure, output from dynamical data may: (1) generally include; or (2) provide an ability to derive similar atmospheric and oceanic variables as those contained within reanalysis data. In certain embodiments, reanalysis data as generated in step 304 and dynamical data may be interpolated to a similar grid (e.g., 2.5° latitude by 2.5° longitude, or 1 kilometer by 1 kilometer) to ensure proper identification of predictor variables, which are described in greater detail infra.

Atmospheric and oceanic data contained in reanalyses of step 304, large-scale oscillation indices, and dynamical data are collectively referred to as "predictors" or "predictor variables". In other embodiments, predictors may comprise any combination of reanalysis data and dynamical data or may consist solely of one of these types of predictors (e.g., only reanalysis data, or only dynamical data) for the purpose of generating forecasts.

According to some embodiments, the method can include a step 308 of determining historical severe weather, tropical cyclone, and/or precipitation datasets of interest, generally referred to herein as predictands. In various embodiments, an example method and system disclosed herein can be applied to any weather phenomenon as long as sufficiently strong relationships exist between a phenomenon of interest and larger-scale atmospheric and oceanic conditions. As a result, embodiments of this disclosure involve the use of varying historical weather datasets for use in creating forecasts. In one embodiment (e.g., the L-model of the present disclosure), the NOAA Storm Prediction Center severe weather database (Schaefer and Edwards 1999) can be used to for model calibration and forecasts of tornadoes, thunderstorm wind gusts, and hail—just to name a few. The NOAA database contains historical information on tornadoes, including starting and ending latitude/longitude coordinates, time and date of occurrence, and Fujita scale rating (Fujita 1971, McDonald and Mehta 2006). The NOAA database also contains hail information (e.g., latitude/longitude location, diameter, and date and time of occurrence) and information on thunderstorm wind gusts (e.g., wind magnitude, date, and time of occurrence).

In another embodiment, historical tropical cyclone information contained in the "International Best Track Archive for Climate Stewardship" (IBTrACS, Knupp et al. 2010) was retrieved from the NOAA National Centers for Environmental Information, used for calibrating machine learning models, and generating forecasts of tropical cyclone activity. In another embodiment, historical precipitation information archived by the NOAA Earth Systems Research Laboratory (https://www.esrl.noaa.gov/psd/) are used to calibrate machine learning models and generate precipitation forecasts. Other examples of historical databases of extreme weather events exist and may be utilized for creating forecasts, including "Storm Data" archived at the National Centers for Environmental Information (https://www.ncdc.noaa.gov/stormevents/) and precipitation rates developed as part of the NOAA Precipitation Reconstruction Dataset (archived at the NOAA Earth Systems Research Laboratory). In another embodiment, duststorms can be indirectly identified through locating areas of sufficiently windy and dry surface conditions in dynamical data or reanalyses occurring in areas of bare soil. Again, these databases mentioned above are included in the plurality of data resources 106A-106N (see FIG. 1A).

According to some embodiments, the method includes a step 310 of determining time frames of desired prediction and aggregate appropriate predictands. Varying aggregations of predictands (i.e., severe thunderstorm reports, tropical cyclone tracks, and precipitation) within the domain specified in step 302 may be performed based on desired forecast timeframes. These timeframes are flexible and vary from seven days to one year or more. These predictands can be stored in an array for later use by the service provider system 102. Examples embodiments are provided as follows. If a 15-day forecast of significant (F2+) tornadoes valid for Apr. 15-30, 2018 is desired, an annual count of significant tornadoes for each April 15-30 period from 1965-2017 can be stored in an array by the machine learning service 102 for use in later steps.

In another embodiment, if a monthly forecast of hail (one inch or greater in diameter) valid for September 2018 is desired, then an annual count of hail reports for each September period from 1975-2017 can be stored in an array by the machine learning service 102 for use in later steps. In an embodiment related to tropical cyclone forecasts, if a seasonal forecast of tropical cyclone frequency (valid June-November 2018) is desired, annual counts of tropical cyclones for each June-November period from 1960-2017 can be stored in an array by the machine learning service 102 for use in later steps.

In another embodiment: if a monthly forecast of hurricane activity (valid August 2018) is desired, annual counts of hurricane activity in each August period from 1960-2017 can be stored in an array by the machine learning service 102 for use in later steps. In an embodiment related to generating precipitation forecasts: if a three-month forecast of precipitation (valid January-March 2018) is desired, annual accumulated precipitation totals from each January-March period (from 1960-2017) can be calculated and stored in an array by the machine learning service 102 for use in later steps. While this example uses hurricane activity as an example predictand, other predictands could be used such as tropical cyclone predictands, tropical depression predictands, and so forth. Thus, in general, tropic=storm related predictands could include storms of varying strength/intensity.

In an embodiment related to seasonal forecasts of tornadoes: if a three-month forecast of F1 or greater tornadoes (valid January-March 2018) is desired, annual accumulated tornado counts from each January-March period (from 1960-2017) can be calculated and stored in an array by the machine learning service 102 for use in later steps.

In an embodiment related to year-long forecasts of tornadoes: if a 12-month forecast of F1 or greater tornadoes (valid January-December 2018) is desired, annual accumulated tornado counts for each January-December period (from 1970-2017) can be calculated and stored in an array by the machine learning service 102 for use in later steps.

According to some embodiments, the method includes a step 312 of developing one or more classes of the predictands. The array of predictands developed in step 310 can be converted to an array of classes based on annual predictand frequency. The decision on thresholds for determining these classes can be determined and relates to one or more of: (1) needs of potential end users and (2) relative sample sizes of the classes. Examples of classes are listed in Tables 1-6 below:

TABLE 1

| Classes | F2+ Tornadoes |
|---|---|
| 0 | 0-1 |
| 1 | 2-3 |
| 2 | 4-5 |
| 3 | 6-8 |
| 4 | 9-11 |
| 5 | 12+ |

TABLE 2

| Classes | Tornadoes |
|---|---|
| 0 | Below annual mean |
| 1 | At or above annual mean |

TABLE 3

| Classes | Tropical Cyclones |
|---|---|
| 0 | 0 |
| 1 | 1 |
| 2 | 2 |
| 3 | 3 |
| 4 | 4 |
| 5 | 5 |

TABLE 4

| Classes | Thunderstorm Wind events |
|---|---|
| 0 | 0-1 |
| 1 | 2-10 |
| 2 | 11-19 |
| 3 | 20-39 |
| 4 | 40-59 |
| 5 | 60-99 |
| 6 | 100-149 |
| 7 | 150-299 |
| 8 | 300-499 |
| 9 | 500+ |

TABLE 5

| Classes | Precipitation |
|---|---|
| 0 | 0-0.25 inch |
| 1 | 0.26-0.75 inch |
| 2 | 0.76-1.5 inch |
| 3 | 1.51-3 inches |
| 4 | 3.01-6 inches |
| 5 | 6.01-12 inches |
| 6 | 12.01+ inches |

TABLE 6

| Classes | Tornadoes | Percentiles |
| --- | --- | --- |
| 0 | Much Below Normal | 0-10th |
| 1 | Below Normal | 11th-34th |
| 2 | Near Normal | 35th-65th |
| 3 | Above Normal | 66th-89th |
| 4 | Much Above Normal | 90th-100th |

In Table 1, example significant tornado classes (left) and report counts associated with those classes (right) are provided. In Table 2, classes can be separated into above and below normal tornado counts. In other embodiments, the "below" and "at or above" annual mean thresholds can be applied for any predictand. In Table 3, a number of tropical cyclones can be directly converted to classes as a one-to-one relationship. In Table 4, a number of wind reports can be converted to classes based on thresholds in the above table and later used for creating predictions. In Table 5, precipitation accumulations can be converted to classes based on thresholds in the above table and later used for creating predictions. In Table 6, classes of predictands can be created based on where a particular annual predictand falls within the percentile ranges specified in the above table and used for creating predictions.

In some embodiments, the method can include a step 314 of aggregating predictor variables based on desired lead times (e.g., time frame for desired forecast). To be sure, varying aggregations of predictor variables (i.e., atmospheric and oceanic variables) may be performed based on desired forecasts (described above) and desired lead times. These aggregations are performed by the machine learning service 102 via the use of instantaneous or time-averaged (i.e., monthly, biweekly, ten-day, seven-day) periods. Decisions on selecting appropriate, time-dependent aggregations of these data usually depended on the specific phenomena being predicted (e.g., predictands) and timeframes during which those predictands can be accumulated. Examples outlined below provide further clarity on this step. If lead times of one month are desired for the example described above, then instantaneous atmospheric and oceanic reanalysis data valid on March 15 (one month prior to the start of the 15-day period of desired timeframe prediction) can be aggregated annually from 1965-2018 and stored in an array for later processing.

In a separate embodiment, monthly averages of reanalysis data can be used as an alternative to instantaneous reanalysis data for the example described above. In that corresponding example, averages of each reanalysis variable (from February 15-March 15) can be calculated annually (from 1965-2018) and stored in an array for later processing by the machine learning service 102.

In another embodiment, monthly averages of reanalysis data can be used in conjunction with monthly large-scale atmospheric and oceanic indices can be aggregated in a manner similar to that described above. An average of February and March indices and averages of each reanalysis variable (from February 15-March 15) can be calculated annually (from 1965-2018) and stored in an array of predictors for later processing by the machine learning service 102.

For monthly, seasonal, or yearly forecasts of severe weather, monthly averages of each reanalysis variable are stored in an array based on desired lead time of forecasts. For instance, for a three-month forecast of September 2018 hail (as described above), monthly averages of reanalysis variables and monthly large-scale atmospheric and oceanic indices for the June prior to each September period (between 1975-2018) can be calculated and stored in an array for later processing by the machine learning service 102. If a seasonal forecast of January-March 2018 tornadoes is desired with one month of lead-time, monthly averages of reanalysis variables for the December prior to each January-March timeframe (between 1965-2018) was calculated and stored in an array for later processing by the machine learning service 102. Similarly, for year-long forecasts of tornadoes (i.e., January-December 2018), monthly averages of reanalysis variables for the one-month period prior to the forecast timeframe (i.e., December 1964-2017) can be calculated and stored in an array for later processing by the machine learning service 102. It will be understood that the time frame(s) selected for analysis may vary according to the forecast(s) desired as outputs from the systems and methods disclosed herein. Thus, the time frames disclose above are merely examples.

Similarly for tropical-cyclone-related embodiments, monthly averages of each reanalysis variable are stored in an array based on desired lead times of forecasts. For instance, for creating a forecast of August 2018 tropical cyclone occurrence with one month of lead time (as described above), monthly averages of each reanalysis variable for the prior July period (calculated annually between 1960 and 2018) may be stored in an array for later processing by the machine learning service 102.

Likewise, instantaneous, weekly, and monthly periods preceding desired forecast time frames for precipitation (outlined above) can be aggregated and stored for later processing by the machine learning service 102. In other embodiments, dynamical data can be used as an alternative to, or in conjunction with, reanalysis data. For example, monthly averaged reanalysis data from each April between 1965 and 2017 can be stored in an array for forecasting April 2018 tornado activity, while dynamical forecasts of monthly averages of variables derived from the NOAA Climate Forecast System for April 2018 can also be added to that same array for later processing by the machine learning service 102. In another embodiment, year-long forecasts from dynamical models (i.e., Community Climate System Model) can be combined with year-long reanalysis data averages and stored in an array for later processing by the machine learning service 102.

According to some embodiments, there are a few additional considerations in deciding upon antecedent timeframes of averaging predictor variables for the subsequent processing outlined in later steps. These timeframes are not static and can be customized to a) implicitly encapsulate the behavior of specific predictor variables and/or certain larger-scale atmospheric and oceanic oscillations known to influence weather conditions around the world (i.e., El Nino Southern Oscillation, Pacific Decadal Oscillation, North Atlantic Oscillation, Pacific/North American teleconnection pattern, Global Wind Oscillation, Madden-Julian Oscillation, and others listed above) and/or b) explicitly encapsulate the behavior of the aforementioned large-scale oscillations via the use of archived indices from sources listed in step 304. These timeframes can range from less than two weeks (for predictor variables that vary rapidly) to multiple months or more (for oceanic oscillations that evolve slowly).

Variance of specific predictor variables (as described in 304 and 306) may only be available in instances where specified timeframes (spanning multiple days to a month or more) of predictor variable averaging is being employed. Variances may not be calculated for instantaneous predictors in some embodiments.

In one or more embodiments, the method can include a step 316 of dividing data obtained from the plurality of data resources 106A-106N into segments. In various embodiments, the segments can include training, testing, and validation datasets. Once desired predictands and associated predictor variables are aggregated (as outlined in step 310 and step 312, respectively), these data are separated into three subsets: a first portion for training (roughly 60% of all data), a second portion for validation (roughly 20% of all data), and a third portion for testing (roughly 20% of all data). The individual compositions of these portions, relative to one another, may vary according design requirements (e.g., based on desired forecast outcomes and the phenomenon that is being predicted). For example, in some embodiments, rather than 60/20/20 the ratio may be 63/38/2, or 70/20/5, as other examples.

Segmentation can be performed in any desired manner although in certain embodiments, a few criteria can be employed by the machine learning service 102 in order to address limitations in prior predictand datasets (particularly the non-meteorological trends in NOAA Storm Prediction Center severe weather database as described in Verbout et al. 2006). These criteria area as follows. The testing dataset may contain both recent (e.g., 2017-2018) and early year (e.g., 1965-1970) predictor variables and may be treated independently of the training and validation datasets. The validation dataset may also contain both recent (e.g., 2012-2016) and early year (e.g., 1970-1975) datasets. In additional embodiments of the present disclosure, linear and non-linear detrending of predictands can be applied to address potential biases and other aforementioned limitations in historical reports databases.

Figure 5:
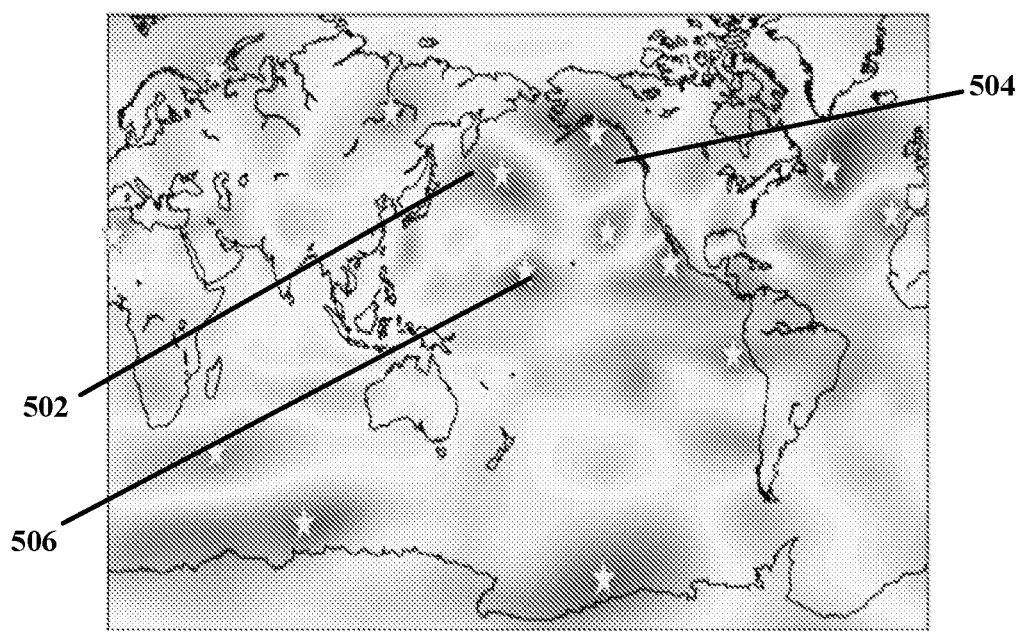
FIG. 5 graphically illustrates the use of a spatial filtering routine.

According to some embodiments, the method can include a step 318 of determining regions where a strongest relationship or relationships exist(s) between predictor variables and predictands. In some embodiments, the machine learning service 102 utilizes the training dataset to create a series of arrays containing correlations between each predictor variable (outlined in steps 304 and 306) and predictand (outlined in steps 308 and 310). The machine learning service 102 can create a correlation array for each predictor variable. Locations of extrema in each of those correlation arrays can be identified via spatial filtering routines applied by the machine learning service 102 (see FIG. 5 as an example of spatial filtering). In more detail, in FIG. 5, a map 500 comprises shaded areas represent magnitudes of positive (red such as area 502) and negative (blue such as area 504) correlations between January annual hail reports in Mississippi (1985-2015) and November monthly 500 hPa geopotential heights two months prior to the hail occurrences (1984-2014). The stars, such as star 506 represent local extrema. 500 hPa geopotential height data located at each local extreme from each November monthly period can be stored and later evaluated for potential use in generating forecasts as disclosed below.

Corresponding predictor variables at each local extreme (identified in each correlation array as noted above) can be selected for potential incorporation into subsequently developed models and stored into an array for further processing by the machine learning service 102. For instance, if a local correlation extrema (relating November monthly mean 500 hPa geopotential height and January monthly hail instances in Mississippi) was identified at 35° N, 75° W, then November monthly mean 500 hPa geopotential height values at that location (identified through reanalysis and/or dynamical data) can be stored for each year in the training dataset and later used by the machine learning service 102 to create models and predictions as outlined infra. This process can be repeated for predictor variables in the validation and testing datasets using locations of correlation extrema identified in arrays correlating predictor variables in the training dataset and predictands. That data was also stored in separate arrays for creating models and predictions as disclosed below. Magnitudes of corresponding correlations can be also stored in a separate array to assist in variable selection as follows.

In one or more embodiments, time frames for identifying locations of correlation extrema between predictor variables and predictands can differ from time frames selected for identifying predictors in the training dataset. These timeframes are not static and can be customized to implicitly encapsulate the behavior of specific predictor variables and/or certain larger-scale atmospheric and oceanic oscillations. In certain embodiments, locations of correlation extrema (e.g., relating January variance of 300 hPa v-component wind concurrent and predictands) can be combined by the machine learning service 102 with locations of correlation extrema from a different timeframe (e.g., relating November monthly mean 500 hPa geopotential height values and predictands). Ultimately, a choice of time frames for identifying locations of correlation extrema may dependent on which combinations of variables maximize forecast accuracy.

In one or more embodiments, the method can include a step 320 of normalizing stored predictor variables. Predictor variables (identified in steps 304 and 306 above) can be normalized to values between 0 and 1. In additional embodiments, variables may also be scaled to values between −1 and 1 or standardized by the machine learning service 102.

According to some embodiments, the method can include a step 322 of generating or creating a series of machine learning models. Multiple models are created iteratively by the machine learning service 102 using the training dataset. Each model tests a separate combination of the following: machine learning algorithms (support vector machines for classification, support vector machines for regression, random decision forests, neural networks for multilayer perceptron classification, neural networks for multilayer perceptron regression, and restricted Boltzmann machines), kernels (for support vector machines, including radial basis functions, linear, and polynomial kernel types), solvers (for neural networks, including stochastic gradient descent and quasi-Newton methods), hidden layer sizes (for neural networks), tuning and penalty parameters (increased incrementally and tested for improved model predictions), and quantities and combinations of predictor variables. Predictor variables can be added in sequential order, with most strongly correlated variables added first. In other embodiments, large-scale oscillation indices (described in step 304) can be exclusively used to create models or combined with other predictor variables (i.e., reanalysis data). In a separate embodiment, weights can also be applied subjectively to individual subsets of predictor variables. Given the number of unique combinations of machine learning algorithms, kernels, tuning parameters, numbers of variables, and weights of variables to be incorporated, over 6000 models can be created and evaluated in any given forecast creation process by the machine learning service 102. In some embodiments, weighting of variables may be used when those variables have a correlation magnitude greater than 0.5. In additional embodiments, predictor variables can be added randomly (without any regard to geographical location or correlation magnitude), or within a restricted geographical domain (i.e, to exclude polar regions, or regions less likely to exhibit meaningful predictors).

According to some embodiments, the method can include a step 324 of evaluating results of the series of machine learning models. For each model or a subset thereof, created in step 322, a series of predictions may be created by the machine learning service 102 for each year in the training dataset (each of the predictions can be expressed as classes as described in step 310). Then, errors can be calculated by counting a total number of classes each model forecast deviated from the classes that can be actually observed. An idealized example is contained in Table 7 below:

| |
|---|
| 1979 prediction: 5; actual: 5.0 |
| 1980 prediction: 5; actual: 5.0 |
| 1981 prediction: 1; actual: 1.0 |
| 1982 prediction: 1; actual: 1.0 |
| 1983 prediction: 2; actual: 2.0 |
| 1984 prediction: 1; actual: 1.0 |
| 1985 prediction: 3; actual: 3.0 |
| 1986 prediction: 2; actual: 2.0 |
| 1987 prediction: 1; actual: 1.0 |
| 1988 prediction: 2; actual: 3.0 |
| 1989 prediction: 3; actual: 3.0 |
| 1990 prediction: 0; actual: 0.0 |
| 1991 prediction: 0; actual: 0.0 |
| 1992 prediction: 1; actual: 1.0 |
| 1993 prediction: 1; actual: 1.0 |
| 1994 prediction: 0; actual: 0.0 |
| 1995 prediction: 2; actual: 2.0 |
| 1996 prediction: 1; actual: 1.0 |
| 1997 prediction: 1; actual: 1.0 |
| 1998 prediction: 5; actual: 5.0 |
| 1999 prediction: 1; actual: 1.0 |
| 2000 prediction: 0; actual: 0.0 |
| 2001 prediction: 1; actual: 1.0 |
| 2002 prediction: 5; actual: 5.0 |
| 2003 prediction: 4; actual: 4.0 |
| 2004 prediction: 3; actual: 3.0 |
| 2005 prediction: 3; actual: 3.0 |
| 2006 prediction: 0; actual: 0.0 |
| 2007 prediction: 2; actual: 2.0 |
| 2008 prediction: 5; actual: 4.0 |
| 2009 prediction: 1; actual: 1.0 |
| 2010 prediction: 2; actual: 2.0 |
| 2011 prediction: 2; actual: 2.0 |
| 2012 prediction: 1; actual: 1.0 |
| 2013 prediction: 1; actual: 1.0 |
| 2014 prediction: 2; actual: 0.0 |
| 2015 prediction: 1; actual: 1.0 |
| Absolute error: 4.0 |

Table 7 comprises an example list of model class predictions in each year of a sample training dataset (prediction column) and actual observed classes (actual column). The absolute error of these predictions is four (4) due to prediction errors in 1988 (1), 2008 (1), and 2014 (2). In the example outlined in Table 7, 37 would be a perfect score (zero forecast errors in 37 years of training data). The actual score is 33, however (a penalty of four based on the total number of classes each model forecast deviated from the actual observed classes during the years of 1988, 2008, and 2014). When expressed as a ratio, the score of the example in Table 7 is 89.2% (33÷37).

In various embodiments, the method can include a step 326 of selecting a best-performing model and generating forecasts based on the best-performing model. In one or more embodiments, a two-step process was employed for selecting the best-performing model. In a first process, the machine learning service 102 can determine models that scored 75% or higher (based on the scoring process described in step 324) may be retained for further testing by the machine learning service 102. Each retained model is used to determine predicted classes for each year of the validation dataset by the machine learning service 102. The model containing the least amount of error in predicting classes from the validation dataset (based on scoring in step 324) can then be selected to make predictions using independent data not contained in the training or validation datasets (i.e., the testing dataset).

It will be understood that the testing dataset contains predictor variables at the timeframes of desired forecasts (i.e., April 2018 significant tornadoes). Forecasts based on predictor variables for the testing dataset are the basis for example forecasts shown in FIG. 2 and also a subsequent step disclosed below. In other embodiments, step 326 can be completed using lower scoring thresholds (i.e., 50%) to identify potentially useful models for generating forecasts. These thresholds assist in identifying models that may generalize to new data and do not over-fit to training predictors. To be sure, skill scores as mentioned and described through the disclosure can be used as a basis for model selection, and can include, but are not limited to bias, false alarm, or other similar skill scores that would be known to one of ordinary skill in the art.

In one or more embodiments, the method can include an optional step 328 of establishing probabilities. In more detail, probabilities of a particular classification (based on support vector machines for classification, and random forests by the machine learning service 102) can be generated using the predict_proba algorithm within scikit-learn in Python. These probabilities are automatically generated by the machine learning service 102 when generating predictions via scikit-learn and tensorflow algorithms in Python. Other similar computing languages can be utilized by the machine learning service 102.

Figure 6:
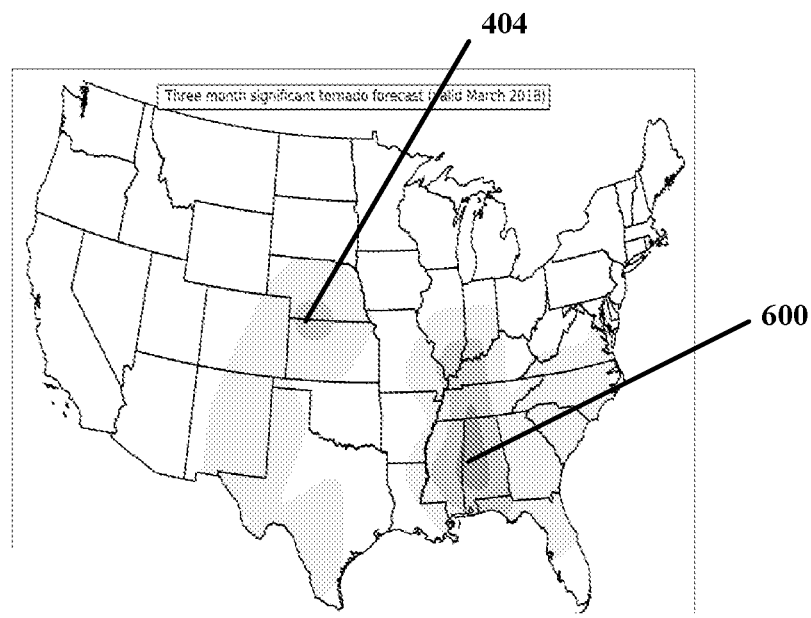
FIG. 6 illustrates a forecast generated for two separate two-dimensional domain spaces.
Figures 7A, 7B:
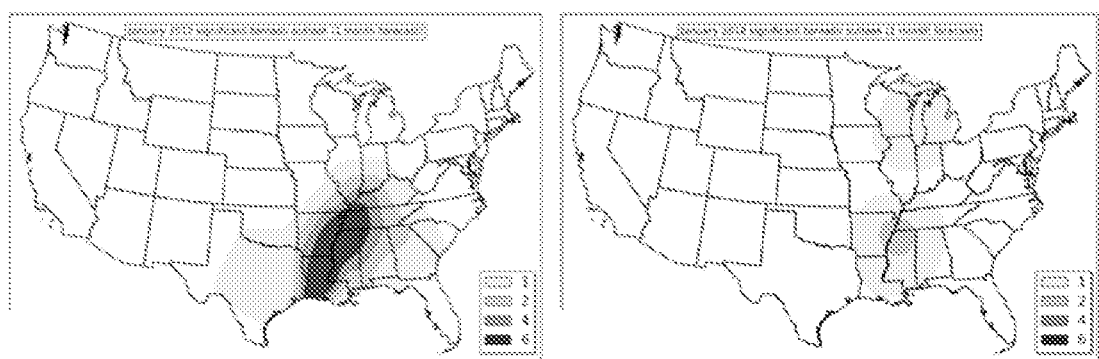
FIGS. 7A and 7B collectively illustrate maps generated using the machine learning processes disclosed herein, specifically illustrating active and inactive severe weather periods.

In one or more embodiments, the method can include an optional step 330 repeating steps 302-328 for additional domains. That is, the process outlined in steps 302-328 can be repeated for multiple domains and multiple time periods to provide insights into regional severe weather activity (see FIG. 6 that includes the domain 404 of FIG. 4A and an additional domain 600) and even discriminate between active and inactive severe weather periods (FIGS. 7A and 7B). FIG. 6 illustrates a significant tornado forecast valid for March 2018. Forecasts are of concentrations of tornadoes within roughly 75 miles of a point along and east of the Rockies. The underlying domain used in creating this information is located in FIG. 9.

Example significant tornado forecasts valid January 2017 (FIG. 7A) and January 2018 (FIG. 7B). Forecasts are of concentrations of significant tornadoes within roughly 75 miles of a point along and east of the Rockies. Tornadoes resulted in 20 fatalities and over 380 injuries in January 2017 across the southern United States. January 2018 was markedly less active. The underlying grid used to create this information is illustrated in FIG. 8.

Figure 8:
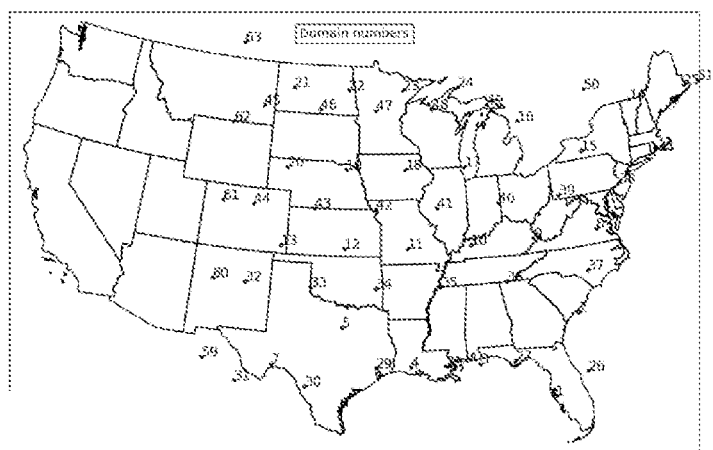
FIGS. 8 and 9 both illustrate underlying grids for creating composite overviews as illustrated in FIGS. 7A and 7B.
Figure 9:
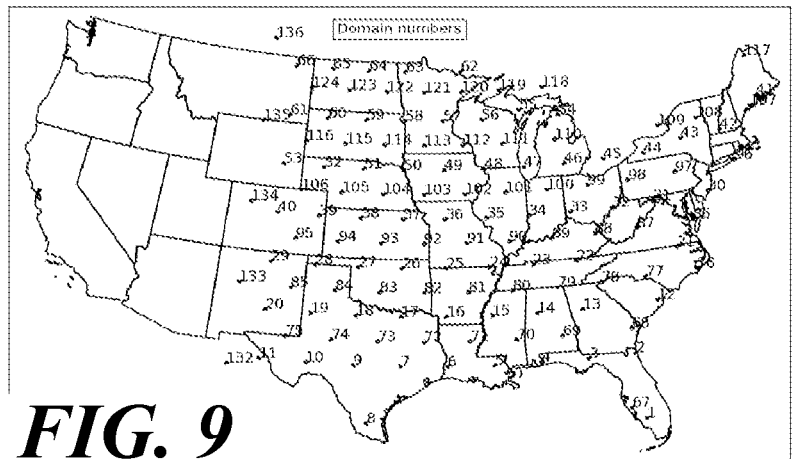

Two examples of underlying grids for creating these types of composite overviews are described and illustrated in FIGS. 8 and 9. FIG. 8 illustrates domain centerpoints for an irregular domain used to develop a visual representation of monthly forecasts of severe thunderstorm activity. Each point is centered on a domain that is roughly 5° latitude by 5° longitude (except for regions near coasts and international borders). The domain is designed to overlap such that multiple forecasts are created for any given point in the Continental United States (along and east of the Rocky Mountains). FIG. 9 is similar to FIG. 8 but includes a domain that is roughly 3° latitude by 3° longitude.

Figure 10:
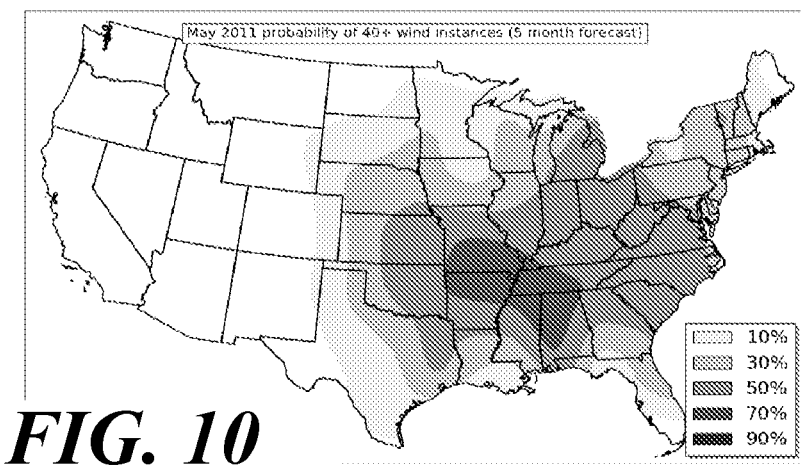
FIGS. 10 and 11 each illustrate different long-range forecasts that can be provided in a map format, the forecasts being generated using the machine learning processes disclosed herein.

In different embodiments, these grids can be adjusted for smaller, larger, and/or multiple customized regions. Additional sample forecasts are located in FIGS. 10 and 11. FIG.

Figure 11:
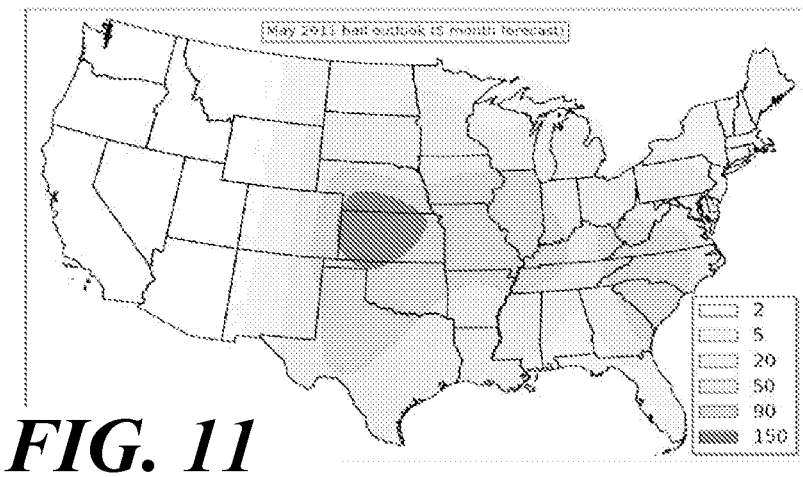

10 illustrates a probability of 40+ thunderstorm wind reports within 75 miles of a point (valid May 2011 (5 month forecast)). The underlying grid used to generate this forecast is shown in FIG. 8. FIG. 11 illustrates a forecast of 1-1.99 inch hail instances within 75 miles of a point along and east of the Rocky Mountains (also valid May 2011 (5 month forecast)). The underlying grid used to generate this forecast is shown in FIG. 8.

Figure 12:
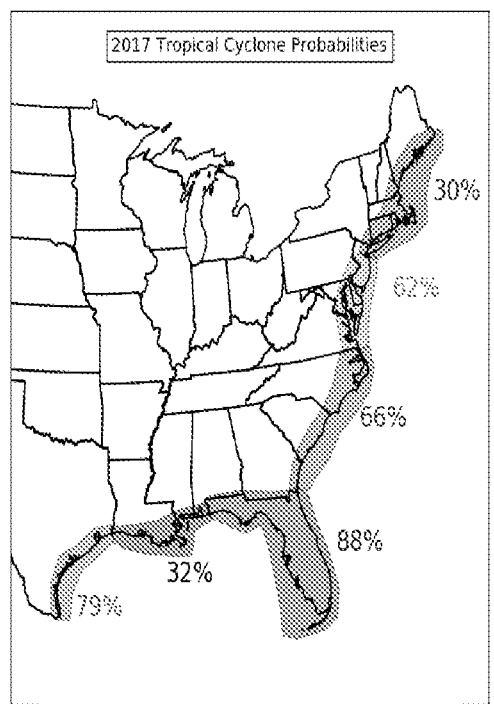
FIG. 12 is a map of an example tropical cyclone forecast generated using the machine learning processes disclosed herein.

An embodiment resulting in probabilistic tropical cyclone landfall forecasts is also provided in FIG. 12, which illustrates 2017 tropical cyclone landfall forecast probabilities. Domains (color-shaded polygons) can be customized in order to assess probabilities of landfalls in particular regions of the U.S. Percentages are color-coded to correspond with each domain and express the likelihood of at least one tropical cyclone occurring within each domain in 2017. For instance, the region surrounding the Texas coastline had a 79% chance of one or more tropical cyclones occurring in the region, while regions surrounding the Florida coastline had an 88% chance of one or more tropical cyclones. The probabilities can be created by repeating the steps of the method of FIG. 3 for each domain. In additional embodiments of the present disclosure, probabilities of a major hurricane occurring in a given domain can be provided. Greater time resolution (i.e., hurricane landfall forecasts occurring in August 2017, etc.) can also be produced in other embodiments.

Figures 13A, 13B:
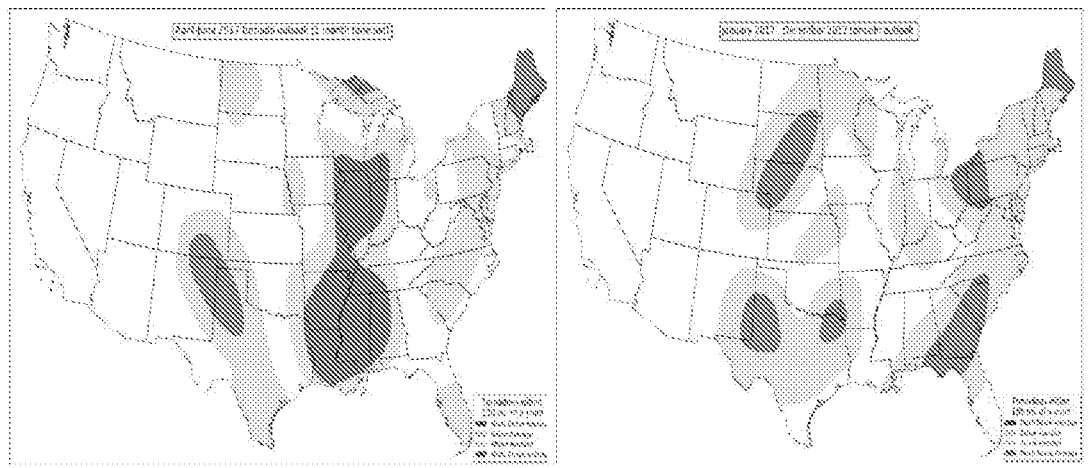
FIG. 13A illustrates a map of a seasonal forecast for a specific type of weather event, the map being generated using the machine learning processes disclosed herein.

FIG. 13 illustrates a map of an example spring 2017 seasonal tornado outlook (valid April-June 2017). Forecasts are of above normal, much above normal, below normal, much below normal, and near normal F1+ tornado activity during the April-June 2017 period. FIG. 13B illustrates a map of an example year-long 2017 tornado outlook (valid January-December 2017). Forecasts are of above normal, much above normal, below normal, much below normal, and near normal F1+ tornado activity during the April-June 2017 period.

According to some embodiments, the systems and methods disclosed herein can utilize an ensemble of model output to generate a forecast or prepare a disaster model. In some embodiments, rather than running a single model for a plurality of rounds relative to a single domain, the systems and methods herein can be adapted to execute models with various predictands and parameters over more than one domain. In some embodiments, these domains may slightly overlap in their geographical boundaries relative to one another. For example, domain 1 and domain 2 may each have geographical boundaries that overlap by ten percent. For example, a northernmost portion domain 1 may overlap a southernmost portion of domain 2.

In another example, multiple model types can be created in accordance with the embodiments disclosed herein. In one example, a first model may include a first set of predictands and/or parameters, whereas a second model may include a second set of predictands and/or parameters that are different from the first model. The first model may be executed against a first domain. The second model may be executed against a second domain. As noted above, these domains may be geographically independent, or may overlap geographically. A resulting forecast or disaster model/prediction may include an ensemble of these two model outputs. In some embodiments, the ensemble can include an average or other statistical calculation or operation performed on the model outputs. In one example, the systems and methods may determine a weighted average, where one or more of the model outputs for one or more of the domains are weighted. In one embodiment, the systems and methods could apply weighting to models based on proximity to a specific area of interest. For example, a domain that is closest to a desired area of prediction may have its model output weighted higher than areas that are farther away or geographical areas having general climatological differences that are distinct from the domain of interest. To be sure, any number of different models can be executed against any number of overlapping or non-overlapping domains.

Example Embodiments

In some instances, the following examples may be implemented together or separately by the systems and methods described herein. One embodiment is directed to machine learning method, comprising: specifying a spatial domain of for creating a desired forecast using machine learning; determining historical atmospheric and oceanic data from a plurality of data resources; determining predictands for a weather event of interest from the historical atmospheric and oceanic data; determining one or more time frames for a desired prediction, the one or more time frames being up to approximately a year in advance; determining dynamical model forecasts; aggregating predictor variables from the dynamical model forecasts based on the one or more time frames; dividing the predictands and the predictor variables into segments that include a training dataset, a testing dataset, and a validation dataset; determining regions in the spatial domain where a strongest relationship or relationships exist(s) between predictor variables and predictands; generating or creating a series of machine learning models using the training dataset; selecting a best-performing model of the series of machine learning models; generating forecasts based on the best-performing model; automatically generating probabilities for the forecasts; selecting a highest probability forecast of the forecasts; and generating at least one of a map or a disaster model from the forecast.

Another embodiment includes aggregating one or more of the predictands based on the weather event of interest, while some embodiments include generating an array of the predictands; converting the array of the predictands into one or more classes of predictands based on annual predictand frequency; standardizing the stored predictor variables; and normalizing stored predictor variables.

Various embodiments include wherein the spatial domain is a geographical region defined by a range of 0.25 degrees latitude by 0.25 longitude, to 5 degrees latitude by 5 degrees longitude, inclusive. In one embodiment, the training dataset comprises a ratio comprising a first portion of the predictands and the predictor variables, the testing dataset comprises approximately 20 percent a second portion of the predictands and the predictor variables, and the validation dataset comprises a third portion of the predictands and the predictor variables.

According to some embodiments, a method can include generating a series of arrays comprising correlations between each of the predictor variables and each of the predictands.

Some embodiments comprise determining extrema in each of the correlations via spatial filtering, as well as selecting predictor variables associated with the extrema and incorporating the same into the series of machine learning models.

Some embodiments include wherein each of the series of machine learning models includes at least one of a combination of one or more machine learning algorithms, one or more kernels, one or more solvers, one or more hidden layer sizes, one or more tuning and penalty parameters, and one or more quantities and combinations of the predictor variables.

In one or more embodiments, the predictor variables can be added in sequential order in such a way that most strongly correlated variables are added first, further wherein at least a portion of the predictor variables can be weighted. In some instances, the predictor variables are further determined from large-scale oscillation indices. In additional embodiments, predictor variables can be added randomly (without any regard to geographical location or correlation magnitude), or within a restricted geographical domain (i.e, to exclude polar regions, or regions less likely to exhibit meaningful predictors).

In one or more embodiments, the series of machine learning models includes at least thousands of machine learning models. Some methods include evaluating results of the series of machine learning models; and generating a series of predictions for each year in the training dataset.

Various embodiments include calculating errors by determining a total number of classes of each of the series of machine learning models of the forecasts which deviated from classes that can be actually observed.

One or more embodiments include selecting the machine learning model of the series of machine learning models with a least amount of errors; and obtaining independent datasets, as well as applying the machine learning model with the least amount of errors to the independent datasets.

In various embodiments, the independent datasets include only portions of the historical atmospheric and oceanic data and the dynamical model forecasts that can be not used to generate the training dataset.

In some embodiments, a method can comprise specifying a spatial domain of for creating a desired forecast for a weather event of interest using machine learning; determining predictands for the weather event of interest from historical atmospheric and oceanic data; determining dynamical model forecasts or large-scale oscillation data; determining predictor variables from the dynamical model forecasts; dividing the predictands and the predictor variables into segments that include a training dataset, a testing dataset, and a validation dataset; determining regions in the spatial domain where a strongest relationship or relationships exist(s) between the predictor variables and the predictands; generating a series of machine learning models using the training dataset; and generating forecasts based on a best-performing model of the series of machine learning models.

In various embodiments, the method comprises automatically generating probabilities for the forecasts; selecting a highest probability forecast of the forecasts; and generating at least one of a map or a disaster model from the forecast.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A machine learning method, comprising:
   specifying a spatial domain for creating a desired forecast using machine learning;
   determining predictor variables from a plurality of data resources including at least one of historical atmospheric data and historical oceanic data;
   determining predictands for a weather event of interest from the historical atmospheric and the historical oceanic data, or any combination thereof;
   determining one or more time frames for a desired prediction, the one or more time frames being up to approximately a year in advance;
   determining dynamical model forecasts;
   aggregating predictor variables from at least one of the dynamical model forecasts and a plurality of data resources based on the one or more time frames;
   dividing the predictands and the predictor variables into segments that include a training dataset, a testing dataset, and a validation dataset;
   determining regions in the spatial domain where a strongest relationship or relationships exist(s) between predictor variables and predictands and incorporating one or more predictor variables therefrom into a series of machine learning models;
   generating the series of machine learning models using the training dataset;
   selecting a best-performing model of the series of machine learning models;
   generating forecasts based on the best-performing model;
   automatically generating probabilities for the forecasts;
   selecting a highest probability forecast of the forecasts; and
   generating at least one of a map or a disaster model from the forecast.

2. The method according to claim 1, further comprising aggregating one or more of the predictands based on the weather event of interest.

3. The method according to claim 1, further comprising:
   generating an array of the predictands;
   converting the array of the predictands into one or more classes of predictands based on annual predictand frequency;
   standardizing the stored predictor variables; and
   normalizing stored predictor variables.

4. The method according to claim 1, wherein the spatial domain is a geographical region defined by a range of 0.25 degrees latitude by 0.25 longitude, to 5 degrees latitude by 5 degrees longitude, inclusive.

5. The method according to claim 1, wherein the training dataset comprises a ratio comprising a first portion of the predictands and the predictor variables, the testing dataset comprises approximately 20 percent a second portion of the predictands and the predictor variables, and the validation dataset comprises a third portion of the predictands and the predictor variables.

6. The method according to claim 1, wherein each of the series of machine learning models includes at least one of a combination of one or more machine learning algorithms, one or more kernels, one or more solvers, one or more hidden layer sizes, one or more tuning and penalty parameters, and one or more quantities and combinations of the predictor variables.

7. The method according to claim 1, wherein the predictor variables are further determined from large-scale oscillation indices.

8. The method according to claim 1, wherein the series of machine learning models includes at least thousands of machine learning models.

9. The method according to claim 1, further comprising:
evaluating results of the series of machine learning models; and
generating a series of predictions for each year in the training dataset.

10. The method of claim 1, further comprising generating at least one of a map or a disaster model from at least one of the forecasts.

11. The method of claim 1, wherein the predictands comprise tornado events, hail storm events, thunderstorm events, a seasonal average of temperature, or any combination thereof.

12. The method according to claim 5, further comprising generating a series of arrays comprising correlations between each of the predictor variables and each of the predictands.

13. The method according to claim 6, wherein the predictor variables can be added in sequential order in such a way that most strongly correlated variables are added first, further wherein at least a portion of the predictor variables can be weighted.

14. The method according to claim 9, further comprising calculating errors by determining a total number of classes of each of the series of machine learning models of the forecasts which deviated from classes that can be actually observed.

15. The method according to claim 12, further comprising determining extrema in each of the correlations via spatial filtering.

16. The method according to claim 9, further comprising:
selecting the machine learning model of the series of machine learning models with a least amount of errors; and
obtaining independent datasets; and
applying the machine learning model with the least amount of errors to the independent datasets.

17. The method according to claim 15, further comprising selecting predictor variables associated with the extrema and incorporating the same into the series of machine learning models.

18. The method according to claim 16, wherein the independent datasets include only portions of the historical atmospheric and oceanic data and the dynamical model forecasts that can be not used to generate the training dataset.

* * * * *